United States Patent
Makeev et al.

(10) Patent No.: US 9,558,175 B2
(45) Date of Patent: Jan. 31, 2017

(54) GENERATING AN INDIVIDUALIZED WEB PAGE TEMPLATE WITH ENTITIES OF A WEB PAGE PUBLISHER ORGANIZATION ASSOCIATED WITH AREAS OF THE TEMPLATE

(75) Inventors: Evgeniy Makeev, Belmont, CA (US); Jeff Budzinski, San Jose, CA (US); Scott Roy, Palo Alto, CA (US); Annie Cheng, Milpitas, CA (US); Timothy Daly, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 476 days.

(21) Appl. No.: 13/614,965

(22) Filed: Sep. 13, 2012

(65) Prior Publication Data

US 2014/0075293 A1 Mar. 13, 2014

(51) Int. Cl.
  *G06F 17/00* (2006.01)
  *G06F 17/24* (2006.01)
  *G06F 17/30* (2006.01)

(52) U.S. Cl.
  CPC ......... *G06F 17/248* (2013.01); *G06F 17/3089* (2013.01)

(58) Field of Classification Search
  CPC .................................................... G06F 17/248
  USPC ........................................................ 715/235
  See application file for complete search history.

(56) References Cited

U.S. PATENT DOCUMENTS

| | | | |
|---|---|---|---|
| 6,779,153 B1* | 8/2004 | Kagle | 715/235 |
| 7,174,506 B1* | 2/2007 | Dunsmoir et al. | 715/207 |
| 7,617,449 B2* | 11/2009 | Carlson et al. | 715/243 |
| 7,747,941 B2* | 6/2010 | Campbell et al. | 715/234 |
| 2007/0118796 A1* | 5/2007 | Nazem | G06F 17/2288 715/255 |
| 2007/0162845 A1* | 7/2007 | Cave | G06F 17/218 715/209 |
| 2009/0077495 A1* | 3/2009 | Bhat | G06F 17/3089 715/811 |
| 2009/0158166 A1* | 6/2009 | Dewar | G06Q 30/02 715/745 |
| 2009/0319372 A1 | 12/2009 | Makeev | |
| 2011/0066977 A1* | 3/2011 | DeLuca | G06F 17/30867 715/811 |
| 2013/0054348 A1* | 2/2013 | Holsman | G06Q 30/00 705/14.43 |

* cited by examiner

*Primary Examiner* — Asher Kells
(74) *Attorney, Agent, or Firm* — Berkeley Law & Technology Group, LLP

(57) ABSTRACT

Briefly, embodiments disclosed herein may relate to generating signals and/or states representative of a template for a web page. One or more areas of a template may be associated with a respective one or more entities of a web page publisher, and content for the one or more areas associated with the one or more entities may be selected.

20 Claims, 7 Drawing Sheets

GENERATING AN INDIVIDUALIZED WEB PAGE TEMPLATE WITH ENTITIES OF A WEB PAGE PUBLISHER ORGANIZATION ASSOCIATED WITH AREAS OF THE TEMPLATE

BACKGROUND

Field

Subject matter disclosed herein may relate to laying out a web page for display on a user computing platform.

Information

With networks such as the Internet gaining tremendous popularity, and with the vast multitude of pages and/or content, such as documents, digital media, and/or applications, for example, becoming available to users via the World Wide Web (web), it may be desirable to provide efficient and streamlined approaches to gather and/or display content that may be desired by and/or useful to a user. Internet-based business entities, such as Yahoo!, for example, may provide a wide range of content that may be available to users via the Web. In some circumstances, challenges may be faced in determining which content to display to a user via a web page.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1:
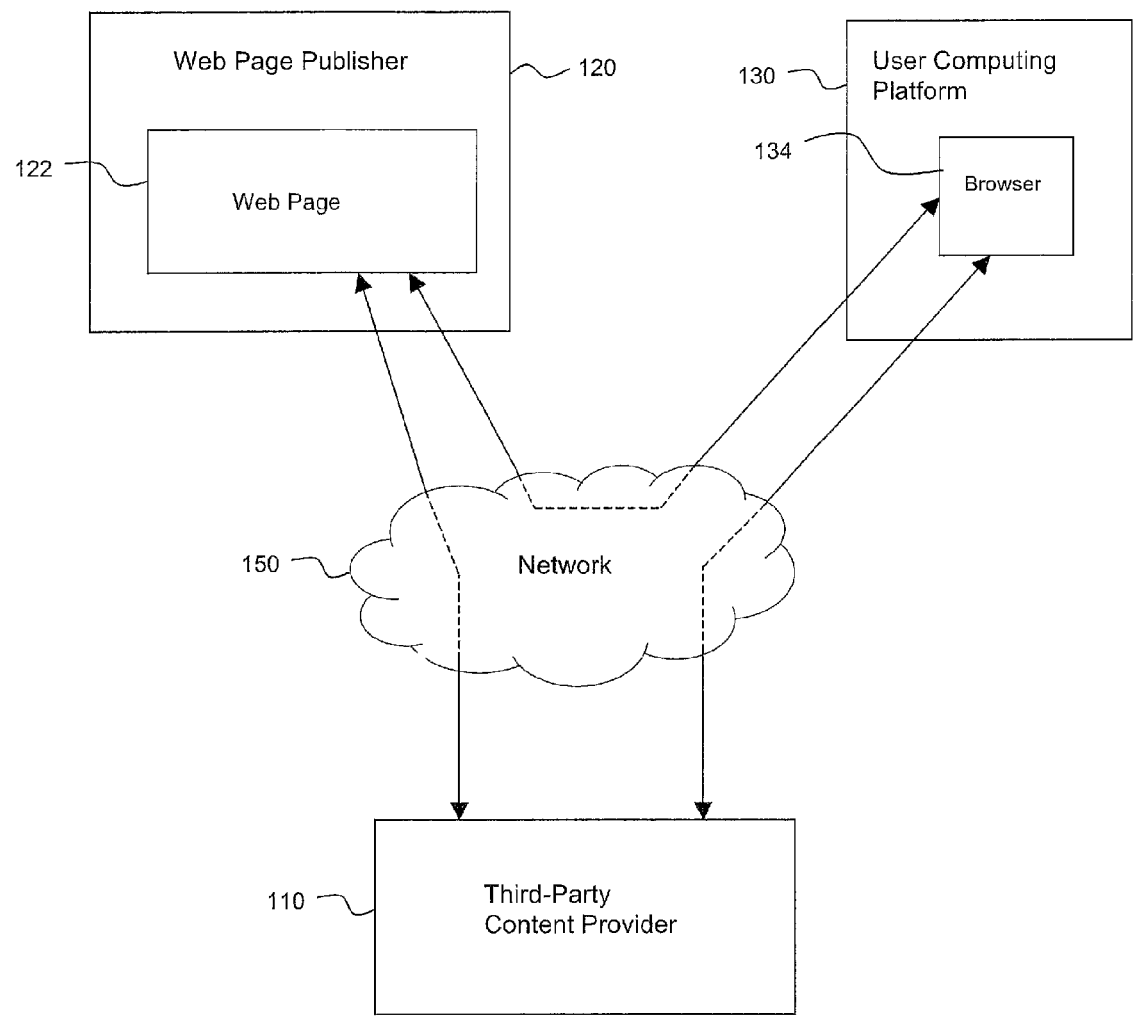
FIG. 1 is a diagram illustrating an example system including a web page publisher and a user computing platform in accordance with an embodiment.

Reference is made in the following detailed description to the accompanying drawings, which form a part hereof, wherein like numerals may designate like parts throughout to indicate corresponding and/or analogous elements. It will be appreciated that elements illustrated in the figures have not necessarily been drawn to scale, such as for simplicity and/or clarity of illustration. For example, dimensions of some elements may be exaggerated relative to other elements for clarity. Further, it is to be understood that other embodiments may be utilized. Furthermore, structural and/or logical changes may be made without departing from the scope of claimed subject matter. It should also be noted that directions and/or references, for example, up, down, top, bottom, and so on, may be used to facilitate discussion of drawings and/or are not intended to restrict application of claimed subject matter. Therefore, the following detailed description is not to be taken to limit the scope of claimed subject matter and/or equivalents.

DETAILED DESCRIPTION

As mentioned above, Internet-based business entities such as Yahoo!, for example, may provide a wide range of content, including, for example, applications and/or information that may be available to users via the Web. In some circumstances, challenges may be faced in determining which content to gather and/or display to a user. For example, it may be desirable to provide users with individualized experiences as users browse a company's web site. For companies or other entities with relatively large Internet presences, it may not be possible to provide space on a web site front page or home page for even a small percentage of possible information that might be made available to a user. For example, a company such as Yahoo! may have numerous entities or "properties" that may be made available to a user. Example entities within Yahoo! that may provide content that may be provided to a user on a web page may include Yahoo! Sports, Yahoo! News, Yahoo! Movies, Yahoo! Jobs, Yahoo! Finance, etc., to name but a few examples. A large amount of content from large amounts of entities within an organization such as Yahoo! may provide difficulties in determining which content to provide to a user to enhance the user's experience in visiting the company's web site. For example, it may not be possible to select content to display on a front page that would satisfy all users who visit the web site. As used herein, the term "front page" refers to a web page to which a visitor to a web site may be directed upon initially browsing to the web site.

Another potential challenge that a company or other entity with a relatively large Internet presence may face may comprise determining how to provide exposure to entities or properties within a company that might languish in obscurity without some kind of presence on a front page of a web site. Therefore, determining which entities are to be afforded a presence on a front page may be a challenge faced by at least some larger business entities, for example, in addition to providing users with improved and/or individualized user experiences.

A process in accordance with one or more embodiments may comprise producing a template for a web page. In an embodiment, a template may be produced based at least in part on one or more browsing characteristics of a user. Also in an embodiment, a template may be produced in a manner that provides an individualized experience for an individual user. Further, in an embodiment, discrete areas on a web page template may be designated for use by one or more selected entities within an organization, and individual entities may provide content that may be displayed within the discrete areas of the web page. Content to be displayed to an individual user may be selected based at least in part on browsing characteristics of an individual user, in an embodiment.

FIG. 1 is a diagram illustrating an embodiment 100 of a system including a web page publisher computing platform 120, a user computer platform 130, and a third party content provider 110. Web page publisher 120, user computing platform 130, and third party content provider 110 for this example may be interconnected by a network 150. In an embodiment, network 150 may comprise an internet, such as the Internet, although claimed subject matter is not limited in scope in this respect.

In an embodiment, the Internet may comprise a worldwide system of computing platforms and computer networks and may further comprise a public, self-sustaining facility that may be accessible to tens of millions of people worldwide. Also, in an embodiment, and as mentioned previously, a widely used part of the Internet may comprise the World Wide Web, often abbreviated "WWW" or simply referred to as just "the web". The web may comprise an Internet service that organizes information through the use of hypermedia. A HyperText Markup Language ("HTML") may be utilized to specify contents and format of a hypermedia document, such as a web page. An Extensible Markup Language (XML) may also be utilized to specify contents and format of a web page, in an embodiment. As used herein, a "web site" may refer to a collection of related web pages, in an embodiment. Also as used herein, "web page" may relate to any electronic document that may be accessed via a network, such as the web, in an embodiment. As alluded to above, in one or more embodiments, a web page may comprise a document coded using one or more markup languages, such as, for example, HTML and/or XML, although claimed subject matter is not limited in scope in this respect. Further, as used herein, the term "content" may refer to any electronic document, digital media, application, and/or information, for example, that may be depicted on a web page, although claimed subject matter is not limited in scope to the particular example types of content mentioned herein.

User computing platform 130 for an embodiment may comprise a processor (not shown) that may execute instructions, including executing instructions related to a web browser 132. Web browser 132 may, in an embodiment, be executed by user computing platform 130 to allow a user to access and view web pages from across the Internet, including pages published by web page publisher 120, for example. To view a page published by web page publisher 120, browser 132 may cause the page to be downloaded from web page publisher 120 to user computing platform 130, where the page may be displayed to a user. A web page may be identified by a Uniform Resource Identifier (URI) such as, for example, a Uniform Resource Locator (URL) associated with the web page, in an embodiment.

In an embodiment, web page publisher 120 may comprise a business entity having multiple sub-entities, referred to simply as "entities", or "properties" that individually may produce content that may be published as part of a web page, such as web page 122. As used herein, the terms "entities" and "properties" are used interchangeably. Also, in an embodiment, web page publisher 120 may incorporate content from one or more third party providers, such as third party content provider 110. Web page publisher 120 may produce a web page template as a basis for a front page to be associated with a particular user, and may populate a web page template with content from one or more properties within web page publisher 120 and/or from one or more third party content providers, such as third party content provider 110. In an embodiment, web page publisher 120 may, produce a web page template at least in part by generating a template and/or by selecting a template from among a plurality of templates.

Figure 2:
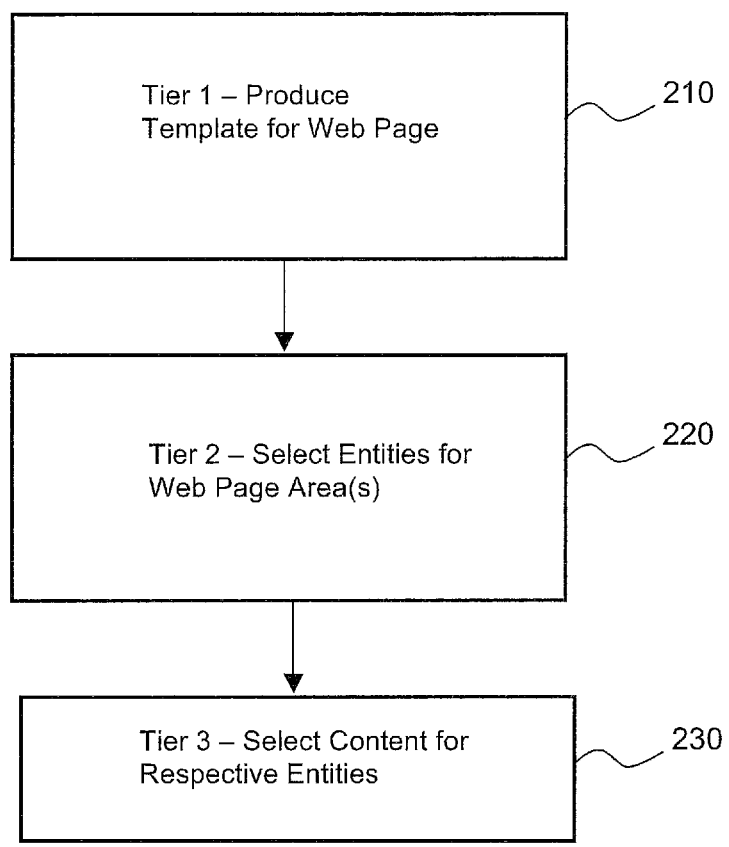
FIG. 2 is an illustration depicting an example process for producing a layout for a web page in accordance with an embodiment.

FIG. 2 is an illustration depicting an example process for producing a layout for a web page in accordance with an embodiment. At block 210, a template may be produced for a web page. In an embodiment, a web page template may be selected from among a plurality of provided choices by a user according to a user's preference. In an additional embodiment, a template may be selected based at least in part on information contained in a user's profile page. In an alternative embodiment, a template may be selected based at least in part on a user's browsing behavior. For example, a history may be maintained of which links a user may select over a period of time as a user browses one or more web sites. As used herein, "click-through rate" refers to a measure of how often a user selects a particular link located in a web page. Also in an embodiment, a "conversion rate" may be tracked for one or more links located on a web site. For example, a conversion rate for a link embedded in an advertisement on a web page may comprise a measure of how often a selection of a particular link results in a sale. Of course, this is merely an example conversion rate measurement, and claimed subject matter is not limited in scope in this respect. Also, although some embodiments may base a selection and/or generation of a web page template at least in part on click-through rates and/or conversion rates, other embodiments may utilize other criteria.

Also, in an embodiment, a web page template may comprise one or more discrete areas in which content from respective entities related to a web site may be displayed. At block 220, one or more entities may be selected for one or more respective areas of a web page template. In an embodiment, a user may explicitly specify one or more entities for one or more respective areas of a web page template. Additionally, in an embodiment, other criteria may be utilized by which one or more entities may be selected for one or more respective areas of a web page template. Criteria may comprise, for example, click-through rates and/or conversion rates, although claimed subject matter is not limited in this respect. Additional criteria may comprise relevance to a user query, user profile information, user current location and/or location history, user interest patterns gleaned from browsing history, recommendations from one or more friends, etc, although again, claimed subject matter is not limited in scope in this respect.

In an embodiment, a process for designating particular entities associated with a web page publisher, such as web page publisher 120, may be performed in an iterative manner, although claimed subject matter is not limited in scope in this respect. For example, a determination may be made to associate a first entity with a first area of a web page template associated with a particular user. The determination with respect to the first entity may be utilized as at least a portion of information utilized to determine a second entity to associate with a second area of a web page template associated with a particular user. Additional information related to a particular user's browsing behavior may also be available for a subsequent iteration of an entity designation process. Also, in an embodiment, properties related to potential entities that may be associated with neighboring areas of a web page may be taken into account in determining entities to associate with areas of a web page template.

Additional factors that may be considered in determining one or more entities to associate with one or more areas of a web page template associated with a particular user may include, for example, average click-though rates and/or conversion rates for respective entities. In an embodiment, overall value of an entity may be a basis on which to determine whether to associate a particular entity with an area of a web page template. In an embodiment, specific content may not be utilized as a basis for determining whether to associate a particular entity with an area of a web page template. In this manner, an entity may have flexibility to change and/or improve content. By basing determinations of which entities to associate with particular areas of a web page template on overall quality demonstrated by respective entities, a competition among various entities within a web page provider organization may develop due to individual entities desiring to have their properties exposed to greater numbers of users.

At block 230, in an embodiment, content may be selected for respective areas of a web page template. In an embodiment, content associated with a particular area of a web page template may be selected by a respective particular entity. Further, in an embodiment, a respective entity may determine which content to display in a respective area according to criteria established by the respective entity. In this manner, individual entities within a larger organization associated with a web site may manage content for areas of a web page designated for the individual entities. By having individual entities provide and/or maintain content for respective areas of a web page, internal competition within an organization between various entities may be established with an eye toward incentivizing individual entities to improve offerings and/or to improve user browsing experience. Also, in an embodiment, underperforming entities may have their areas in a web page template demoted or removed from the web page to make room for an alternate entity. In this manner, lower performing entities may make room for other, better performing entities. Also, less well-known entities may have a chance to be seen by increased amounts of users if lower-performing entities are demoted from a web page template. In an embodiment, feedback with respect to content provided by individual entities may be received from a user by way of a user providing the feedback explicitly and/or by way of gleaning feedback information from user browsing behavior, for example. Of course, claimed subject matter is not limited in scope in these respects.

In an embodiment, information related to a layout of a web page template may be provided to individual entities associated with respective areas of the web page template. In other embodiments, such layout information may not be provided to individual entities so that individual entities are not able to take potentially unfair advantage of content provided by other entities. In this manner, a potentially more fair competition among various entities may be maintained, which in turn may help to promote improvements and/or innovation among the entities, thereby providing an improved browsing experience for users.

Although FIG. 2 depicts blocks 210-230 in an embodiment, other embodiments may incorporate fewer blocks or greater blocks than blocks 210-230. Additionally, the order of blocks 210-230 is merely an example order, and claimed subject matter is not limited in these respects.

Figure 3:
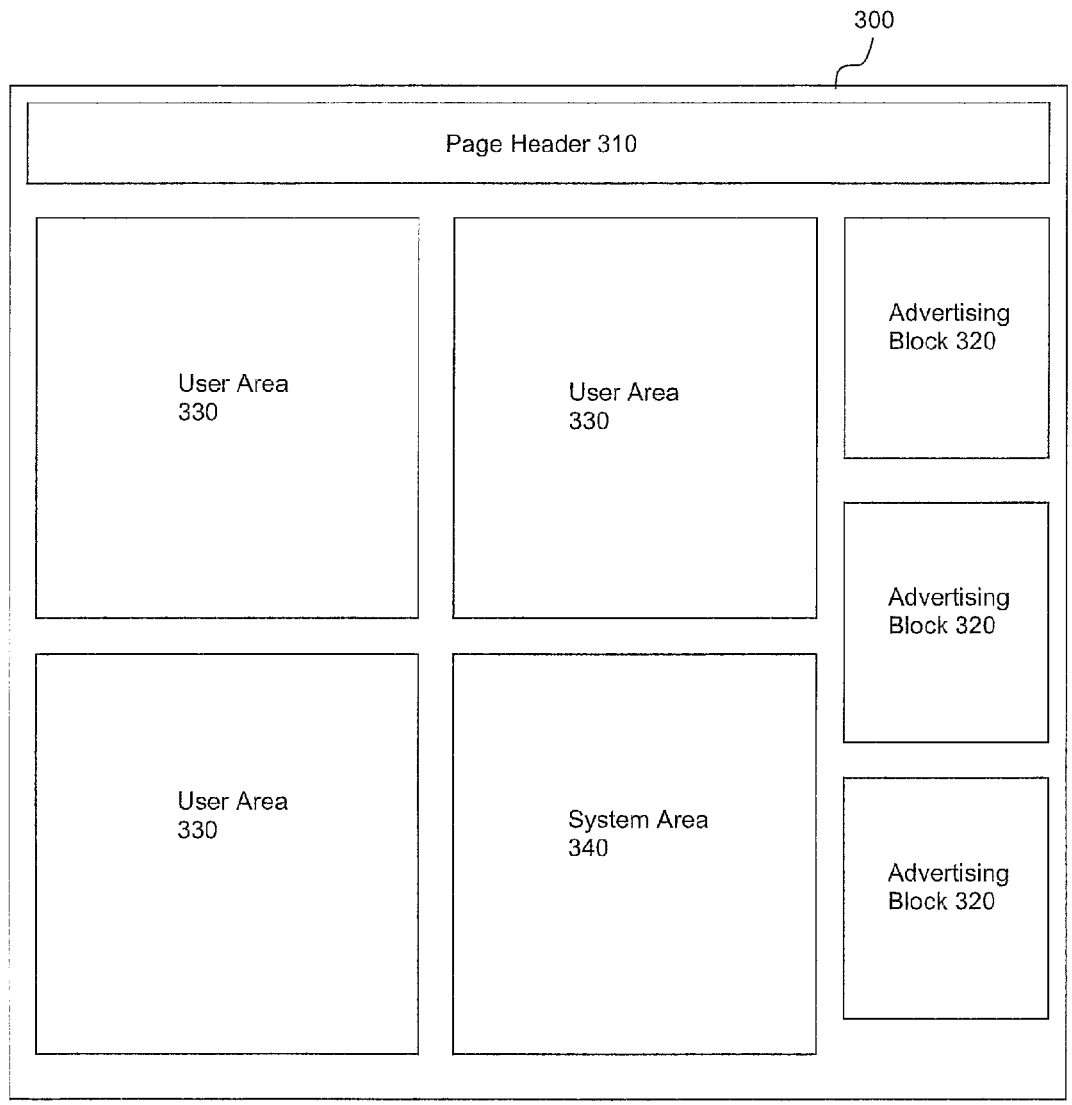
FIG. 3 is an illustration depicting an example web page template in accordance with an embodiment.

FIG. 3 is an illustration depicting an embodiment 300 of a web page template in accordance with an embodiment. Web page template 300, in an embodiment, may comprise a page header 310. In an embodiment, page header 310 may comprise information identifying a web page publisher, such as web page publisher 120, and/or may comprise information identifying a particular user and/or a particular group of users, for example.

Additionally, in an embodiment, web page template 300 may comprise one or more user areas 330 and one or more system areas 340. In an embodiment, a user area, such as user area 330, may comprise a section of a web page template, such as web page template 300, for which a user explicitly and/or implicitly determines which entity of one or more entities associated with a web page publisher, such as web page publisher 120, may provide content. In an embodiment, a particular user associated with web page template 300 may explicitly select one or more entities to provide content for one or more user areas 330. Also, in an embodiment, a user may provide information in a profile page that may be utilized by web page publisher 120 to determine which one or more entities associated with web page publisher 120 are to provide content for one or more user areas 330. Web page publisher may also utilize a user's browsing history to determine one or more entities that may be of interest to the user, and one or more user areas 330 may be populated with content from the determined one or more entities.

In an embodiment, one or more system areas, such as system area 340, may comprise a section of a web page template, such as web page template 300, for which a web page publisher, such as web page publisher 120, may determine one or more entities to associate with system area 340. In this manner, one or more areas, such as user areas 330, of a web page template, such as web page template 300, may be associated with one or more respective entities determined at least in part either explicitly or implicitly by a particular user and one or more areas, such as system area 340, may be associated with one or more respective entities selected by a web page publisher, such as web page publisher 120, in an embodiment.

In an embodiment, one or more system areas, such as system area 340, may be utilized by web page publisher 120 to rotate entities periodically in order to provide increased user exposure for more obscure entities that may be associated with a web page publisher, such as web page publisher 120. For example, various entities may be selected for inclusion in system areas, such as system area 340, in various web page templates associated with respective various users. User feedback may be collected with respect to various entities in the way of click-through rates and/or conversion rates, for example, and additional determinations may be made with respect to which entities to associate with various system areas, such as system area 340, across various user web page templates, in an embodiment.

Web page template 300 may also comprise one or more advertising areas, such as advertising blocks 320, in which a web page publisher, such as web page publisher 120, may place advertising. Embodiments in accordance with claimed subject matter are not limited to any particular technique or selecting advertising for one or more advertising areas, such as advertising blocks 320. In an embodiment, one or more advertising areas, such as advertising blocks 320, may represent one or more additional areas of web page template 300 whose contents are selected according to criteria determined by a web page publisher, rather than by a user as may be the case with one or more user areas, such as user areas 330.

In an embodiment, a user may select a web page template arrangement from among several different arrangement options, for example. In another embodiment, a web page template arrangement may be selected by a web page publisher based, at least in part, on one or more user preferences that may be explicitly expressed by a user and/or that may be gleaned from a user's browsing history.

Additionally, in an embodiment, a web page publisher, such as web page publisher 120, may utilize one or more system areas, such as system area 340, to expose users to new features and/or entities. For example, in an embodiment, a web page publisher, such as web page publisher 120, may periodically cycle entities through a system area, such as system area 340, to expose users to new entities and/or to updated content from existing entities. Also, in an embodiment, user feedback may be obtained to determine which entities are meeting with user satisfaction and/or to determine ways to improve content delivered by one or more entities.

Although web page template 300 is depicted in FIG. 3 as having a particular arrangement, claimed subject matter is not limited in this respect. Similarly, techniques described herein for selecting one or more entities to provide content for one or more respective areas of a web page template are merely example techniques, and again claimed subject matter is not limited in these respects.

Figure 4:
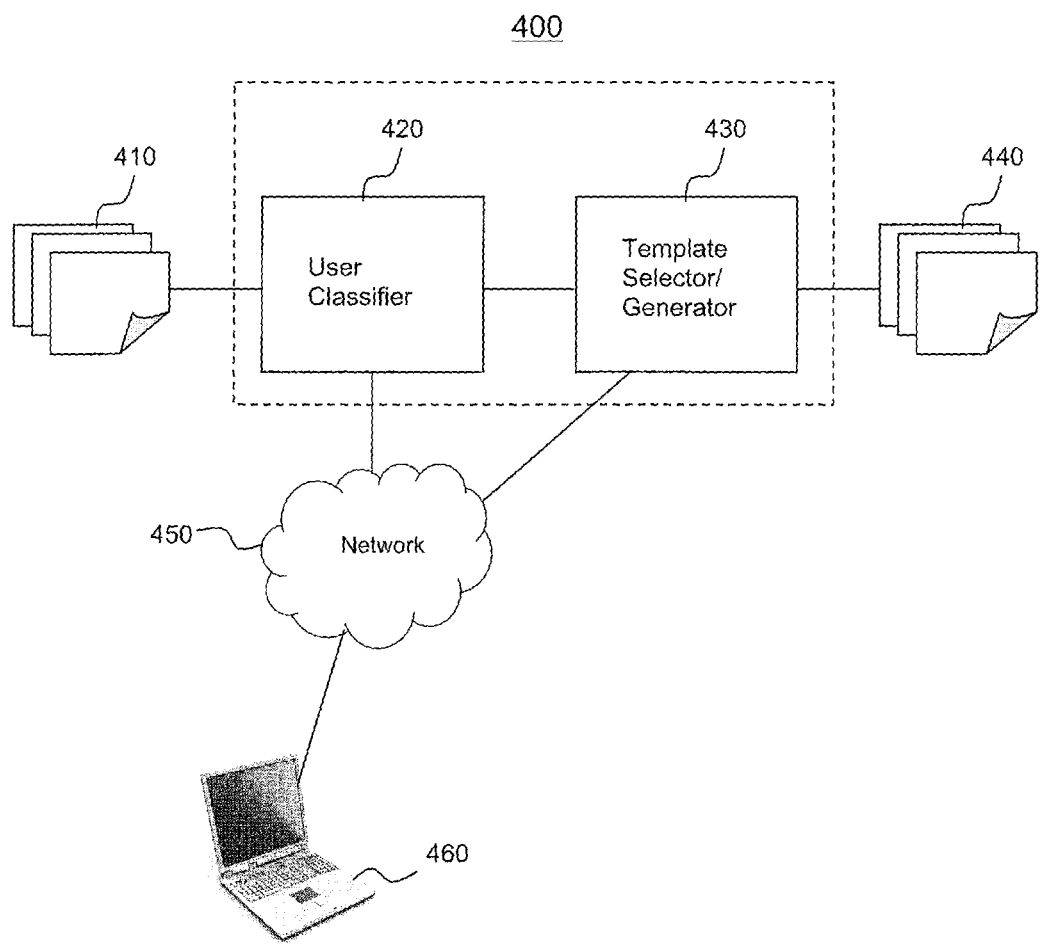
FIG. 4 is a diagram illustrating an example system for producing a layout for a web page in accordance with an embodiment.

FIG. 4 is a functional block system diagram, including elements of an example template generation engine 400, in a networked environment. In an embodiment, template generation engine 400 may comprise a template selector/generator 430 and a user classifier 420. Additionally, template generation engine 400 may comprise a database of previously created templates 440. As depicted in FIG. 4, template generation engine 400 may receive user logs 410 to perform user classification operations to generate information related to particular users on which to base template selection and/or generation decisions in template selector/generator 430. In an embodiment, user classifier 420 may utilize machine learning techniques to determine information about particular users from user logs 410 that may enable template selector/generator 430 to select and/or generate web page templates that would be appropriate for the particular users. In an embodiment, a template from stored templates database 440 may be selected based on user classifier 420 output.

User classifier 420 may comprise one or more machine learning algorithms that may update information learned about a user and the user browses a web site associated with a web page publisher, such as web page publisher 120. Embodiments in accordance with claimed subject matter are not restricted to any particular machine learning techniques. Additionally, template selection and/or generation determinations may be based, at least in part, on information provided by a user from a user computing platform, such as computing platform 460. In an embodiment, user computing platform 460 may communicate with template generation engine 400 by way of a network 450, such as an internet, although claimed subject matter is not limited in this respect.

In an embodiment, as a user browses to a web site associated with a web page publisher, such as web page publisher 120, utilizing a browser, such as browser 134 executed on user computing platform 130, a determination may be made as to which web page to display to the user. In an embodiment, a user's individualized front page may be provided to a user computing platform, such as user computing platform 130. In an embodiment, if a particular web page template layout has recently been selected for the particular user, the recently produced web page layout may be utilized to provide a web page to a browser, such as browser 134, on a user computing platform, such as user computing platform 130. Additionally, in an embodiment, if a sufficient period of time has elapsed since a previous selection and/or generation of a web page template, a new web page template may be produced based at least in part on updated information related to a particular user.

Figure 5:
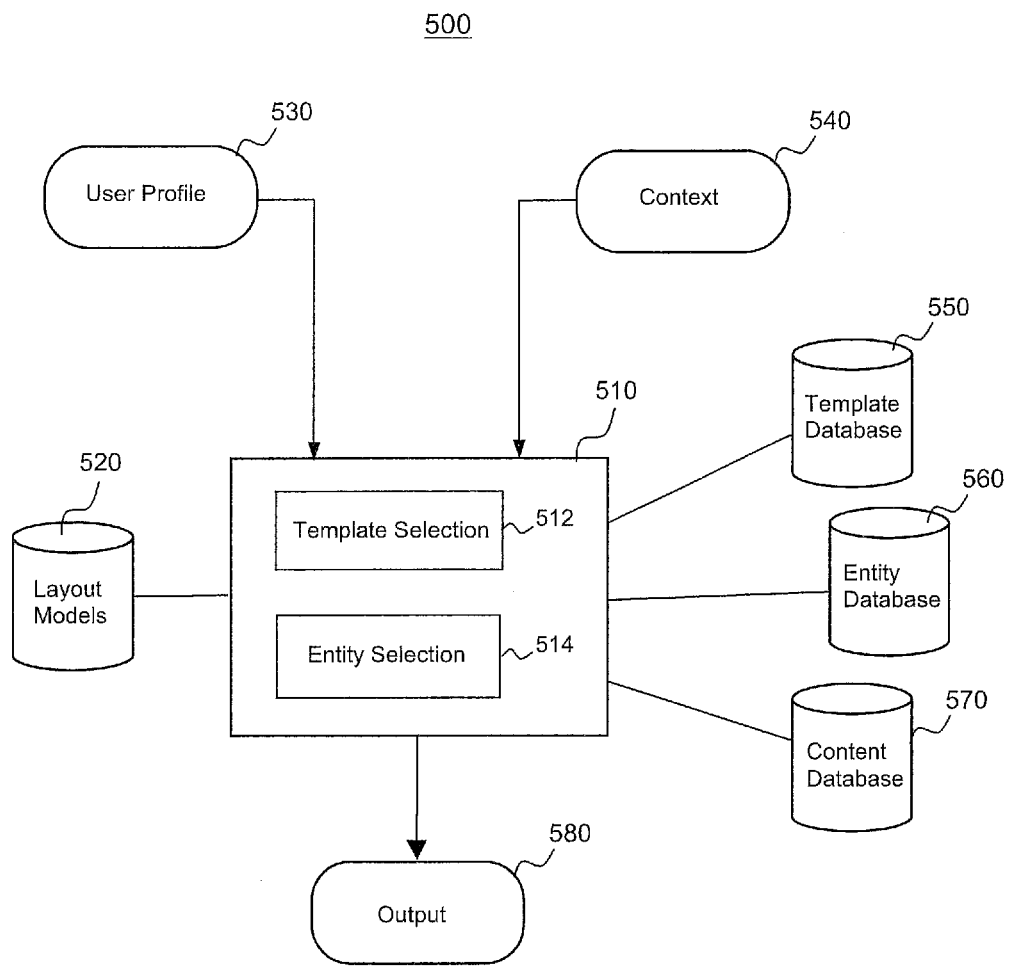
FIG. 5 is a diagram illustrating an example system for producing a web page in accordance with an embodiment.

FIG. 5 is a diagram illustrating an example system 500 for producing a layout for a web page in accordance with an embodiment. In an embodiment, example system 500 may comprise a layout decision engine 510. Layout decision engine 510 may be implemented as a processor of a computing platform, for example. Layout decision engine 510 may comprise a software agent comprising instructions executable by a processor of a computing platform, in an embodiment. Also, in an embodiment, layout decision engine 510 may produce an output 580, that may include a template layout comprising entity, template, and/or content selections that may be customized according to one or more characteristics of a user, for example.

Further, in an embodiment, layout decision engine 510 may comprise a template selection unit 512 and an entity selection unit 514. In an embodiment, user profile information 530 may be provided to layout decision engine 510, along with context information 540. In an example embodiment, context information may include user internet protocol information and/or referring uniform resource locator (URL) information, to name but a couple of examples. User profile information may include, for example, age, gender, and/or user interests. Of course, claimed subject matter is not limited in scope in these respects.

In an embodiment, template selection unit 512 may produce a template based, at least in part, on user profile information 530 and on context information 540, for example. To produce a template, template selection unit 512 may select a template from among a plurality of templates stored in a template database 550, taking into account the user profile information and context information. Template selection unit 512 may further generate a template based at least in part on the user profile information and/or context information and based, at least in part, on layout models 520. A template may be selected based at least in part on information contained in a user's profile page, and/or on a user's browsing behavior, for example.

Entity selection unit 514 may select one or more entities from an entity database 560 for one or more respective areas of a web page template. In an embodiment, a user may explicitly specify one or more entities for one or more respective areas of a web page template. Additionally, in an embodiment, other criteria may be utilized by which one or more entities may be selected for one or more respective areas of a web page template. As mentioned previously, criteria may comprise, for example, click-through rates and/or conversion rates, although claimed subject matter is not limited in this respect. Additional criteria may comprise relevance to a user query, user profile information, user current location and/or location history, user interest patterns gleaned from browsing history, and/or recommendations from one or more friends, although again, claimed subject matter is not limited in scope in this respect.

Layout decision engine 510 may produce information, content, and/or applications for respective entity areas of a web page template. A content database 570 may store content that may be provided to layout decision engine 510 based, at least in part, on user profile information 530, context information 540, one or more templates produced by template selection unit 512, and/or one or more entities selected by entity selection unit 514. Of course, claimed subject matter is not limited in scope in these respects.

Figure 6:
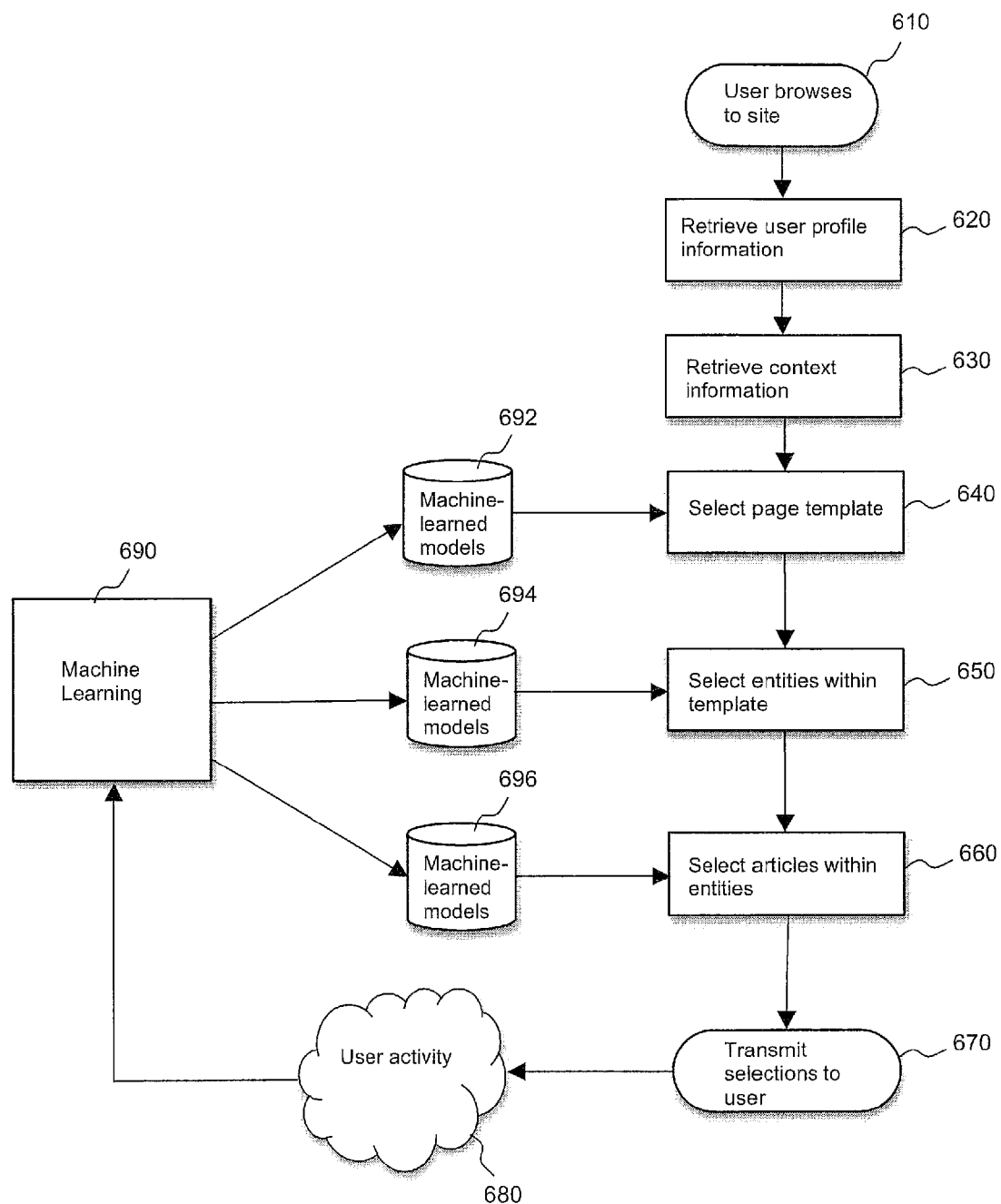
FIG. 6 is a flow diagram illustrating an example process for producing a web page in accordance with an embodiment.

FIG. 6 is a flow diagram illustrating an example process for producing a web page customized for a user in accordance with an embodiment. At block 610, a user may browse to a website. In an embodiment, a user may access and view websites from across the Internet, including a website published by web page publisher, for example. To view a website, a browser executed on a user computer platform may cause a web page to be downloaded from the web page publisher, where the web page may be displayed to a user. In an embodiment, a user may browse to "yahoo.com" for example, although claimed subject matter is not limited in this respect.

In an embodiment, a web page publisher may comprise a business or other organization having multiple entities that individually may produce content that may be published as part of a web page. As described below, a web page publisher may produce a web page template to be associated with a particular user to customize the user's experience in visiting a particular website. A web page template customized according the a particular user may be populated with content from one or more entities within the web page publisher and/or from one or more third party content providers.

To produce a web page customized for a particular user, it may be advantageous to gather information regarding the user and/or other information related to user activity. As depicted in FIG. 6, user profile information may be received at block 620, and context information may be received at block 630. In an embodiment, user profile information may comprise indications of user preferences and/or interests, for example. Also, in an additional embodiment, user profile information may be based at least in part on information contained in a user's profile page. User profile information and/or context information may also include information indicative of a user's browsing behavior. In an embodiment, user profile information may comprise demographic information, and may also comprise user interests. For a particular example, user profile information may comprise the terms "male, 48, Ice Hockey, Outdoors, Technology", indicated gender, age, and several interests. Context information in an embodiment may include requested URL and page classification, referring URL and page classification, and a geographic location for a user. For a particular example, context information may comprise "yahoo.com, portal; finance.yahoo.com, finance; Mammoth Lakes, Calif.", corresponding to a requested URL and page classification, a referring URL and page classification, and a geographic location for the user. Of course, claimed subject matter is not limited in scope to the particular examples described herein.

At block 640, a web page template may be selected. In an alternative embodiment, a template may be generated rather than selected. A web page template selection may be based, for example, at least in part on machine learned models 692 gleaned by a machine learning function 690 from user activity 680, discussed more fully below. For a particular example, a template having one large entity slot and 3 medium entity slots may be selected, although claimed subject matter is not limited in scope in this respect.

At least in part to selecting a web page template at block 640, one or more entities may be selected at block 650 to provide content for a customized web page. In an embodiment, entity selection may be based, at least in part, on a template selection. Also, in an embodiment, entity selection may be based, at least in part, on machine learned models 694 generated at block 690 from user activity 680. For a particular example, selected entities for a selected template may include "sports.yahoo.com/nhl entity module, travel.yahoo.com/California, and http:/finance.yahoo.com/blogs/daily-ticker/", although again, claimed subject matter is not limited in scope in these respects.

Further, in an embodiment, content may be selected at block 660 for a customized web site based, at least in part on entity selection at block 650. In an embodiment, web page content may comprise one or more written articles, such as news articles, for example, selected based at least in part on selected entities. Also, content selection may be based, at least in part, on machine-learned models 696 generated at block 690 from user activity 680, in an embodiment. For a particular example, selected content may include articles related to the San Jose Sharks NHL team, Yosemite National Park, and Yahoo! quarterly results, for example, although claimed subject matter is not limited in scope in this respect.

As further indicated at block 670 of FIG. 6, a web page customized for a particular user may be transmitted from a web page publisher to a user computing platform for display to a user. As mentioned previously, information indicative of subsequent user activity may be gathered at block 680, and such user activity information may be utilized by a machine learning process at block 690 to generate various machine learning models 692, 694, and 696 for template selection, entity selection, and content selection, respectively. Embodiments in accordance with claimed subject matter may include all of blocks 610-696, fewer than blocks 610-696, or more blocks than blocks 610-696. Further, the order of blocks 610-696 is merely an example order, and claimed subject matter is not limited in scope in these respects.

Figure 7:
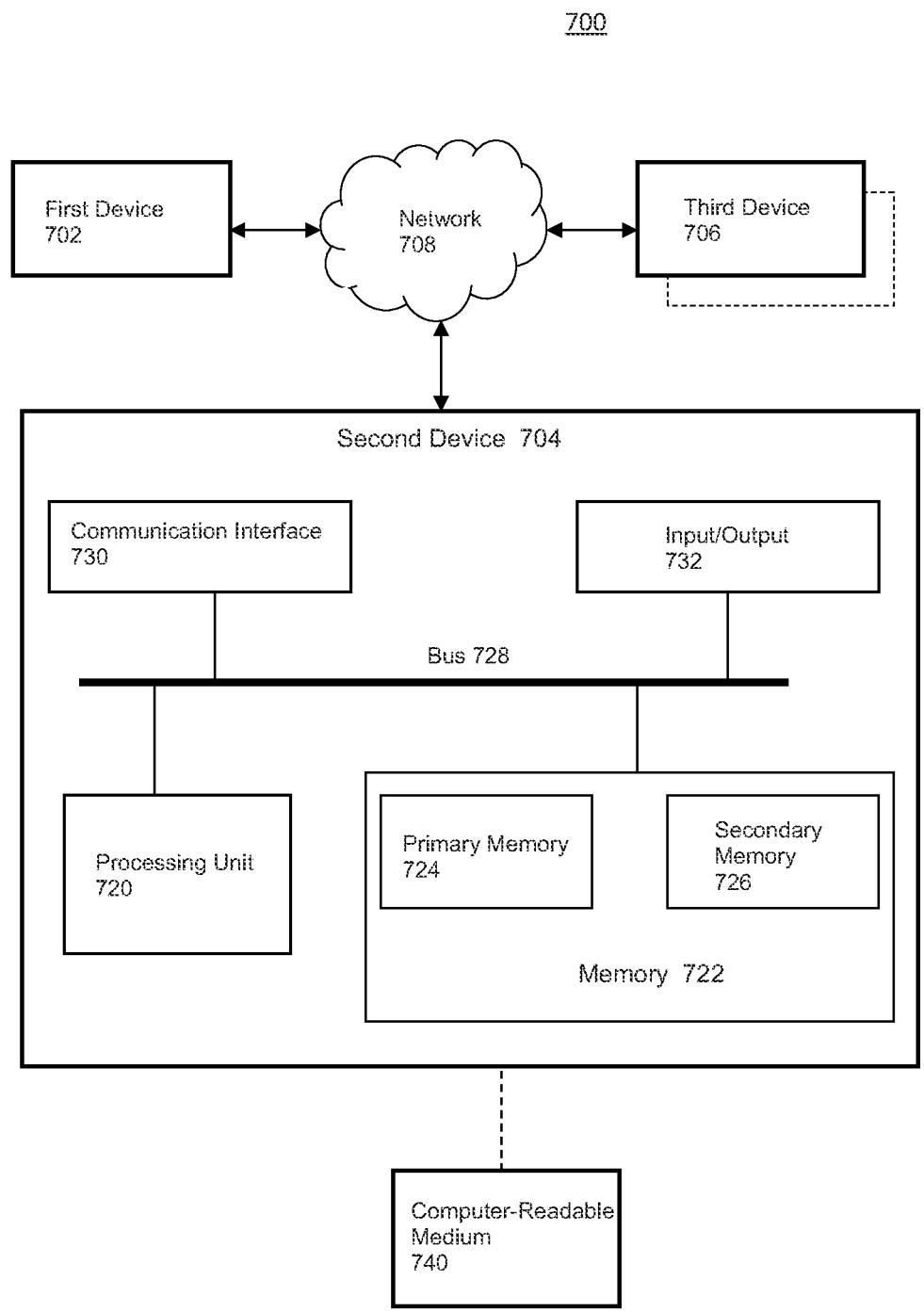
FIG. 7 is a block diagram illustrating an example system comprising a plurality of computing devices coupled via a network in accordance with one or more embodiments.

FIG. 7 is a schematic diagram illustrating an exemplary embodiment 700 of a computing environment system that may include one or more devices configurable to implement techniques and/or processes described above in connection with web pages and/or web page template production discussed above in connection with FIGS. 1-6, for example. System 700 may include, for example, a first device 702, a second device 704, and a third device 706, which may be operatively coupled together through a network 708.

First device 702, second device 704 and third device 706, as shown in FIG. 7, may be representative of any device, appliance or machine that may be configurable to exchange data over network 708. By way of example but not limitation, any of first device 702, second device 704, or third device 706 may include: one or more computing devices and/or platforms, such as, e.g., a desktop computer, a laptop computer, a workstation, a server device, or the like; one or more personal computing or communication devices or appliances, such as, e.g., a personal digital assistant, mobile communication device, or the like; a computing system and/or associated service provider capability, such as, e.g., a database or data storage service provider/system, a network service provider/system, an Internet or intranet service provider/system, a portal and/or search engine service provider/system, a wireless communication service provider/system; and/or any combination thereof.

Similarly, network 708, as shown in FIG. 7, is representative of one or more communication links, processes, and/or resources configurable to support the exchange of data between at least two of first device 702, second device 704, and third device 706. By way of example but not limitation, network 708 may include wireless and/or wired communication links, telephone or telecommunications systems, data buses or channels, optical fibers, terrestrial or satellite resources, local area networks, wide area networks, intranets, the Internet, routers or switches, and the like, or any combination thereof. As illustrated, for example, by the dashed lined box illustrated as being partially obscured of third device 706, there may be additional like devices operatively coupled to network 708.

It is recognized that all or part of the various devices and networks shown in system 700, and the processes and methods as further described herein, may be implemented using or otherwise include hardware, firmware, software, or any combination thereof (other than software per se).

Thus, by way of example but not limitation, second device 704 may include at least one processing unit 720 that is operatively coupled to a memory 722 through a bus 728.

Processing unit 720 may be representative of one or more circuits configurable to perform at least a portion of a data computing procedure or process. By way of example but not limitation, processing unit 720 may include one or more processors, controllers, microprocessors, microcontrollers, application specific integrated circuits, digital signal processors, programmable logic devices, field programmable gate arrays, and the like, or any combination thereof.

Memory 722 may be representative of any data storage mechanism. Memory 722 may include, for example, a primary memory 724 and/or a secondary memory 726. Primary memory 724 may include, for example, a random access memory, read only memory, etc. While illustrated in this example as being separate from processing unit 720, it should be understood that all or part of primary memory 724 may be provided within or otherwise co-located/coupled with processing unit 720.

Secondary memory 726 may include, for example, the same or similar type of memory as primary memory and/or one or more data storage devices or systems, such as, for example, a disk drive, an optical disc drive, a tape drive, a solid state memory drive, etc. In certain implementations, secondary memory 726 may be operatively receptive of, or otherwise configurable to couple to, a computer-readable medium 740. Computer-readable medium 740 may include, for example, any medium that can carry and/or make accessible data, code and/or instructions for one or more of the devices in system 700.

Second device 704 may include, for example, a communication interface 730 that provides for or otherwise supports the operative coupling of second device 704 to at least network 708. By way of example but not limitation, communication interface 730 may include a network interface device or card, a modem, a router, a switch, a transceiver, and the like.

Second device 704 may include, for example, an input/output 732. Input/output 732 is representative of one or more devices or features that may be configurable to accept or otherwise introduce human and/or machine inputs, and/or one or more devices or features that may be configurable to deliver or otherwise provide for human and/or machine outputs. By way of example but not limitation, input/output device 732 may include an operatively configured display, speaker, keyboard, mouse, trackball, touch screen, data port, etc.

The term "computing platform" as used herein refers to a system and/or a device that includes the ability to process and/or store data in the form of signals or states. Thus, a computing platform, in this context, may comprise hardware, software, firmware or any combination thereof (other than software per se). Computing platform 700, as depicted in FIG. 7, is merely one such example, and the scope of claimed subject matter is not limited in these respects. For one or more embodiments, a computing platform may comprise any of a wide range of digital electronic devices, including, but not limited to, personal desktop or notebook computers, high-definition televisions, digital versatile disc (DVD) players or recorders, game consoles, satellite television receivers, cellular telephones, personal digital assistants, mobile audio or video playback or recording devices, or any combination of the above. Further, unless specifically stated otherwise, a process as described herein, with reference to flow diagrams or otherwise, may also be executed and/or controlled, in whole or in part, by a computing platform.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

Methodologies described herein may be implemented by various techniques depending, at least in part, on applications according to particular features or examples. For example, methodologies may be implemented in hardware, firmware, or combinations thereof, along with software (other than software per se). In a hardware embodiment, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and/or apparatuses that would be known by one of ordinary skill have not been described in detail so as not to obscure claimed subject matter.

Some portions of the preceding detailed description have been presented in terms of logic, algorithms and/or symbolic representations of operations on binary states stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result. In this context, operations and/or processing involve physical manipulation of physical quantities. Typically, although not necessarily, such quantities may take the form of electrical and/or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining", "establishing", "obtaining", "identifying", "selecting", "generating", or the like may refer to actions and/or processes of a specific apparatus, such as a special purpose computer or a similar special purpose electronic computing device. In the context of this specification, therefore, a special purpose computer and/or a similar special purpose electronic computing device is capable of manipulating and/or transforming signals, typically represented as physical electronic and/or magnetic quantities within memories, registers, and/or other information storage devices, transmission devices, or display devices of the special purpose computer and/or similar special purpose electronic computing device. In the context of this particular patent application, the term "specific apparatus" may include a general purpose computer once it is programmed to perform particular functions pursuant to instructions from program software.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change and/or transformation in magnetic orientation or a physical change and/or transformation in molecular structure, such as from crystalline to amorphous or vice-versa. In still other memory devices, a change in physical state may involve quantum mechanical phenomena, such as, superposition, entanglement, or the like, which may involve quantum bits (qubits), for example. The foregoing is not intended to be an exhaustive list of all examples in which a change in state for a binary one to a binary zero or vice-versa in a memory device may comprise a transformation, such as a physical transformation. Rather, the foregoing are intended as illustrative examples.

A computer-readable (storage) medium typically may be non-transitory and/or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

While there has been illustrated and/or described what are presently considered to be example features, it will be understood by those skilled in the art that various other modifications may be made, and/or equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and/or equivalents thereof.

The invention claimed is:

1. A method, comprising:
generating one or more signals or states, or a combination thereof, comprising a template for a web page individualized for a particular user utilizing at least in part a processor of a computing device;
associating a plurality of areas of the template with a respective plurality of entities of a web page publisher organization utilizing at least in part the processor of the computing device, wherein one or more entities of the plurality of entities for one or more user areas of the plurality of areas are determined, implicitly or explicitly, or a combination thereof, at least in part by the particular user and another one or more entities of the plurality of entities for one or more system areas of the plurality of areas are determined at least in part on a periodic or rotating basis, or a combination thereof, by the web page publisher organization at least in part to expose the particular user to new entities or to updated content from existing entities, or a combination thereof; and
selecting content for the plurality of areas of the template associated with the respective plurality of entities.

2. The method of claim 1, wherein the generating the one or more signals or states, or the combination thereof, comprising the template for the web page comprises obtaining an indication from the particular user of a selection of the template from a plurality of templates.

3. The method of claim 1, wherein the generating the one or more signals or states, or the combination thereof, comprising the template for the web page is based at least in part on profile content for the particular user.

4. The method of claim 1, wherein the one or more entities of the plurality of entities are determined, implicitly or explicitly, or the combination thereof, at least in part by the particular user based at least in part on one or more browsing characteristics for the particular user.

5. The method of claim 4, wherein the one or more browsing characteristics comprises a click-through rate for the one or more entities of the plurality of entities or a conversion rate for the one or more entities of the plurality of entities, or a combination thereof.

6. The method of claim 5, wherein the click-through rate for the one or more entities of the plurality of entities comprises an average click-through rate or wherein the conversion rate for the one or more entities of the plurality of entities comprises an average conversion rate, or a combination thereof.

7. The method of claim 1, wherein the associating the plurality of areas of the template with the respective plurality of entities of the web page publisher organization comprises demoting at least one of the another one or more entities of the plurality of entities in favor of at least one of an additional one or more entities based at least in part on feedback obtained from the particular user via one or more click-through rates, one or more conversion rates, or a combination thereof.

8. The method of claim 1, wherein the selecting the content for the plurality of areas of the template associated with the respective plurality of entities comprises obtaining content selected by the respective plurality of entities.

9. An article, comprising: a non-transitory computer-readable medium having stored thereon instructions executable by a computing device to:
generate one or more signals or states, or a combination thereof, to comprise a template for a web page to be individualized for a particular user;
associate a plurality of areas of the template with a respective plurality of entities of a web page publisher organization, wherein one or more entities of the plurality of entities for one or more user areas of the plurality of areas are to be determined, implicitly or explicitly, or a combination thereof, at least in part by the particular user and another one or more entities of the plurality of entities for one or more system areas of the plurality of areas are to be determined at least in part on a periodic basis or rotating basis, or a combination thereof, by the web page publisher organization at least in part to expose the particular user to new entities or to content to be updated from existing entities, or a combination thereof; and select content for the plurality of areas of the template to be associated with the respective plurality of entities.

10. The article of claim 9, wherein to generate the one or more signals or states, or the combination thereof, to comprise the template for the web page, the computer-readable medium having stored thereon further instructions executable by the computing device to obtain an indication from particular user of a selection of the template from a plurality of templates.

11. The article of claim 9, wherein the computer-readable medium having stored thereon further instructions executable by the computing device to produce the template for the web page to be based at least in part on profile content for the particular user.

12. The article of claim 9, wherein the one or more entities of the plurality of entities are to be determined, implicitly or explicitly, or the combination thereof, at least in part by the particular user to be based at least in part on one or more browsing characteristics for the particular user.

13. The article of claim 12, wherein the one or more browsing characteristics to comprise one or more of a click-through rate for the one or more entities of the plurality of entities, a conversion rate for the one or more entities of the plurality of entities, or a combination thereof.

14. The article of claim 13, wherein the click-through rate for the one or more entities of the plurality of entities to comprise an average click-through rate or wherein the conversion rate for the one or more entities of the plurality of entities to comprise an average conversion rate, or a combination thereof.

15. The article of claim 9, wherein to associate the plurality of areas of the template with the respective plurality of entities of the web page publisher organization, the computer-readable medium having stored thereon further instructions executable by the computing device to demote at least one of the another one or more entities of the plurality of entities in favor of at least one of an additional one or more entities to be based at least in part on feedback to be obtained from the particular user via one or more click-through rates or conversion rates, or a combination thereof.

16. The article of claim 9, wherein to select the content for the plurality of areas of the template to be associated with the respective plurality of entities, the computer-readable medium having stored thereon further instructions executable by the computing device to obtain content to be selected by the respective plurality of entities.

17. An apparatus, comprising: a processor to:
generate one or more signals or states, or a combination thereof, to comprise a template for an web page to be individualized for a particular user;
associate a plurality of areas of the template with a respective plurality of entities of a web page publisher organization, wherein one or more entities of the plurality of entities for one or more user areas of the plurality of areas are to be determined, implicitly or explicitly, or a combination thereof, at least in part by the particular user and another one or more entities of the plurality of entities for one or more system areas of the plurality of areas are to be determined at least in part on a periodic basis or rotating basis, or a combination thereof, by the web page publisher organization at least in part to expose the particular user to new entities or to content to be updated from existing entities, or a combination thereof; and
select content for the plurality of areas of the template to be associated with the respective plurality of entities.

18. The apparatus of claim 17, wherein the one or more entities of the plurality of entities for the one or more user areas of the plurality of areas are to be determined, implicitly or explicitly, or the combination thereof, at least in part by the particular user to be based at least in part on one or more browsing characteristics for the particular user.

19. The apparatus of claim 18, wherein the one or more browsing characteristics to comprise one or more of a click-through rate for the one or more entities of the plurality of entities, a conversion rate for the one or more entities of the plurality of entities, or a combination thereof.

20. The apparatus of claim 17, wherein to associate the plurality of areas of the template with the respective plurality of entities of the web page publisher organization, the processor to demote at least one of the another one or more entities of the plurality of entities for the one or more system areas of the plurality of areas in favor of at least one of an additional one or more entities to be based at least in part on feedback to be obtained from the particular user via one or more click-through rates, one or more conversion rates, or a combination thereof.

* * * * *